United States Patent
Grubert et al.

(10) Patent No.: US 10,493,434 B2
(45) Date of Patent: Dec. 3, 2019

(54) $NO_x$ ADSORBER CATALYST, METHODS AND SYSTEMS

(71) Applicant: BASF Corporation, Florham Park, NJ (US)

(72) Inventors: Gerd Grubert, Hannover (DE); Torsten Neubauer, Langenhagen (DE); Alfred Punke, Walle (DE); Marcus Hilgendorff, Hannover (DE); Yuejin Li, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/555,131

(22) PCT Filed: Mar. 3, 2016

(86) PCT No.: PCT/US2016/020605
§ 371 (c)(1),
(2) Date: Sep. 1, 2017

(87) PCT Pub. No.: WO2016/141140
PCT Pub. Date: Sep. 9, 2016

(65) Prior Publication Data
US 2018/0043335 A1  Feb. 15, 2018

Related U.S. Application Data

(60) Provisional application No. 62/127,406, filed on Mar. 3, 2015.

(51) Int. Cl.
*B01J 23/10* (2006.01)
*B01J 23/44* (2006.01)
(Continued)

(52) U.S. Cl.
CPC ........ *B01J 23/464* (2013.01); *B01D 53/9418* (2013.01); *B01D 53/9422* (2013.01);
(Continued)

(58) Field of Classification Search
CPC . B01J 23/10; B01J 23/44; B01J 23/464; B01J 23/63; B01J 21/04; B01J 29/7007; B01J 29/7415; B01J 35/0006; B01J 35/04
See application file for complete search history.

(56) References Cited

U.S. PATENT DOCUMENTS 4,961,917 A   10/1990   Byrne
5,300,472 A   4/1994   Brand et al.
(Continued)

FOREIGN PATENT DOCUMENTS

DE   10 2014 106944 A1   11/2014
GB         2510046 A     7/2014
(Continued)

OTHER PUBLICATIONS

Office Action dated Nov. 1, 2017 in Russian Patent Application No. 2017134081.
(Continued)

*Primary Examiner* — Cam N. Nguyen
(74) *Attorney, Agent, or Firm* — Oblon, McClelland, Maier & Neustadt, L.L.P.

(57) ABSTRACT

A lean burn engine exhaust treatment articles comprising a low temperature lean $NO_x$ trap (LT-LNT) composition and methods for their use is disclosed. A lean burn engine exhaust gas treatment system including the lean burn engine exhaust treatment articles is also disclosed. The low temperature lean $NO_x$ trap (LT-LNT) compositions can comprise a washcoat layer on a carrier substrate, the washcoat layer including a platinum group metal component impregnated on a first support material comprising at least 50%
(Continued)

alumina. The washcoat layer may further include a low temperature $NO_x$ storage material comprising a bulk particulate reducible metal oxide. Methods of monitoring the aging state of a lean burn oxidation catalyst in a lean burn engine catalyst system are also disclosed.

29 Claims, 6 Drawing Sheets

(51) Int. Cl.

| | | |
|---|---|---|
| B01J 23/63 | (2006.01) | |
| B01J 21/04 | (2006.01) | |
| B01J 29/70 | (2006.01) | |
| B01J 29/74 | (2006.01) | |
| B01J 35/00 | (2006.01) | |
| B01J 35/04 | (2006.01) | |
| B01J 23/46 | (2006.01) | |
| B01D 53/94 | (2006.01) | |
| B01J 37/02 | (2006.01) | |
| B01J 37/03 | (2006.01) | |
| F01N 3/08 | (2006.01) | |
| F01N 3/20 | (2006.01) | |

(52) U.S. Cl.
CPC ............... *B01J 21/04* (2013.01); *B01J 23/10* (2013.01); *B01J 23/44* (2013.01); *B01J 23/63* (2013.01); *B01J 29/7007* (2013.01); *B01J 29/7415* (2013.01); *B01J 35/0006* (2013.01); *B01J 35/04* (2013.01); *B01J 37/0244* (2013.01); *B01J 37/0246* (2013.01); *B01J 37/0248* (2013.01); *B01J 37/038* (2013.01); *F01N 3/0814* (2013.01); *F01N 3/0842* (2013.01); *F01N 3/2066* (2013.01); *B01D 2255/1021* (2013.01); *B01D 2255/1023* (2013.01); *B01D 2255/1025* (2013.01); *B01D 2255/207* (2013.01); *B01D 2255/2042* (2013.01); *B01D 2255/2047* (2013.01); *B01D 2255/2063* (2013.01); *B01D 2255/2065* (2013.01); *B01D 2255/2066* (2013.01); *B01D 2255/2092* (2013.01); *B01D 2255/20715* (2013.01); *B01D 2255/40* (2013.01); *B01D 2255/502* (2013.01); *B01D 2255/904* (2013.01); *B01D 2255/908* (2013.01); *B01D 2255/91* (2013.01); *B01D 2258/012* (2013.01); *F01N 2370/02* (2013.01)

(56) References Cited

U.S. PATENT DOCUMENTS

| | | | | |
|---|---|---|---|---|
| 5,516,497 | A | 5/1996 | Speronello et al. | |
| 6,296,822 | B1 | 10/2001 | Hepburn et al. | |
| 7,517,510 | B2* | 4/2009 | Chen | B01D 53/945 422/168 |
| 7,754,171 | B2* | 7/2010 | Chen | B01D 53/945 423/213.2 |
| 7,758,834 | B2* | 7/2010 | Chen | B01D 53/945 423/213.2 |
| 7,947,238 | B2* | 5/2011 | Deeba | B01D 53/944 423/213.2 |
| 8,148,290 | B2* | 4/2012 | Mueller | B01D 53/944 502/300 |
| 8,211,392 | B2* | 7/2012 | Grubert | B01D 53/944 423/213.2 |
| 8,393,140 | B2 | 3/2013 | Perry et al. | |
| 8,545,780 | B1* | 10/2013 | Chen | B01D 53/945 423/213.2 |
| 8,617,496 | B2* | 12/2013 | Wei | B01J 23/63 423/213.2 |
| 8,668,877 | B2* | 3/2014 | Wei | B01D 53/944 422/177 |
| 8,679,434 | B1* | 3/2014 | Li | B01J 23/42 423/213.5 |
| 8,833,064 | B2* | 9/2014 | Galligan | B01D 53/945 60/299 |
| 8,906,330 | B2* | 12/2014 | Hilgendorff | B01J 23/464 423/213.5 |
| 8,950,174 | B2* | 2/2015 | Hilgendorff | B01J 23/58 423/213.2 |
| 9,034,269 | B2* | 5/2015 | Hilgendorff | B01J 37/0244 422/170 |
| 9,156,025 | B2* | 10/2015 | Qi | B01J 37/0228 |
| 9,283,547 | B2* | 3/2016 | Alive | B01J 23/63 |
| 9,358,503 | B2* | 6/2016 | Wan | B01D 53/9418 |
| 9,511,352 | B2* | 12/2016 | Qi | B01J 21/04 |
| 9,527,031 | B2* | 12/2016 | Chandler | F01N 3/0222 |
| 9,579,638 | B2* | 2/2017 | Fedeyko | B01D 53/8628 |
| 9,610,564 | B2* | 4/2017 | Xue | B01J 37/10 |
| 9,611,774 | B2* | 4/2017 | Xue | B01J 27/232 |
| 9,687,811 | B2* | 6/2017 | Biberger | B01J 20/02 |
| 9,707,542 | B2* | 7/2017 | Bergeal | B01J 37/0244 |
| 9,707,545 | B2* | 7/2017 | Felix | B01D 53/945 |
| 9,744,529 | B2* | 8/2017 | Xue | B01J 35/0006 |
| 9,931,596 | B2* | 4/2018 | Zheng | B01D 53/945 |
| 9,981,258 | B2* | 5/2018 | Xue | B01J 35/0006 |
| 2005/0129601 | A1 | 6/2005 | Li et al. | |
| 2007/0234708 | A1 | 10/2007 | Jones et al. | |
| 2007/0269353 | A1 | 11/2007 | Li et al. | |
| 2007/0298504 | A1 | 12/2007 | Mueller et al. | |
| 2008/0042104 | A1* | 2/2008 | Chen | B01D 53/945 252/372 |
| 2008/0044329 | A1* | 2/2008 | Chen | B01D 53/945 423/213.2 |
| 2008/0044330 | A1* | 2/2008 | Chen | B01D 53/945 423/213.5 |
| 2011/0154807 | A1 | 6/2011 | Chandler et al. | |
| 2013/0177484 | A1 | 7/2013 | Naito et al. | |
| 2013/0336865 | A1 | 12/2013 | Brisley et al. | |
| 2014/0360171 | A1 | 12/2014 | Xue et al. | |
| 2014/0373510 | A1 | 12/2014 | Schroder et al. | |
| 2015/0252708 | A1 | 9/2015 | Brown et al. | |
| 2015/0360213 | A1 | 12/2015 | Bergeal et al. | |
| 2016/0167022 | A1 | 6/2016 | Chiffey et al. | |
| 2017/0043322 | A1 | 2/2017 | Chandler et al. | |
| 2017/0216822 | A1 | 8/2017 | Chiffey et al. | |
| 2018/0021756 | A1* | 1/2018 | Karpov | B01J 37/16 423/213.5 |

FOREIGN PATENT DOCUMENTS

| | | |
|---|---|---|
| RU | 2504431 | 1/2014 |
| WO | 01/74476 A1 | 10/2001 |
| WO | 2010/114876 A2 | 10/2010 |
| WO | WO 2010/114873 | 10/2010 |
| WO | 2012/175948 A1 | 12/2012 |
| WO | 2014/164876 A1 | 10/2014 |

OTHER PUBLICATIONS

Partial Supplementary European Search Report dated Sep. 17, 2018 in Patent Application No. 16759468.8.
International Search Report and Written Opinion dated May 19, 2016 in PCT/US2016/020605 filed Mar. 3, 2016.
International Preliminary Report on Patentability and Written Opinion dated Sep. 14, 2017 in PCT/US2016/020605.
European Office Action dated Feb. 1, 2019 in European Patent Application No. 16759468.8, 1 page.
Extended European Search Report dated Feb. 15, 2019 in European Patent Application No. 16759468.8, 12 pages.

* cited by examiner

NO$_x$ ADSORBER CATALYST, METHODS AND SYSTEMS

TECHNICAL FIELD

The present invention is directed to lean burn engine exhaust treatment articles comprising a low temperature lean NO$_x$ trap (LT-LNT) composition and methods for their use. The present invention is also directed to lean burn engine exhaust gas treatment system including the lean burn engine exhaust treatment articles disclosed. More particularly, the invention pertains to low temperature lean NO$_x$ trap (LT-LNT) compositions comprising a washcoat layer on a carrier substrate, the washcoat layer including a platinum group metal component impregnated on a first support material comprising at least 50% alumina. The washcoat layer may further include a low temperature NO$_x$ storage material comprising a bulk particulate reducible metal oxide. The present invention is also directed to methods of monitoring aging state of a lean burn oxidation catalyst in a lean burn engine catalyst system.

BACKGROUND

Engines, including diesel engines, are being designed to operate under lean conditions as a fuel economy measure. Such future engines are referred to as "lean burn engines." That is, the ratio of air to fuel in the combustion mixtures supplied to such engines is maintained considerably above the stoichiometric ratio (e.g., at an air-to-fuel weight ratio of 18:1) so that the resulting exhaust gases are "lean," i.e., the exhaust gases are relatively high in oxygen content. Although lean-burn engines provide advanced fuel economy, they have the disadvantage that conventional three-way catalytic converters (TWC) are not effective for reducing NO$_x$ emissions from such engines because of excessive oxygen in the exhaust. Attempts to overcome this problem have included the use of a NO$_x$ trap. The exhaust of such engines are treated with a catalyst/NO$_x$ sorbent which stores NO$_x$ during periods of lean (oxygen-rich) operation, and releases the stored NO$_x$ during the rich (fuel-rich) periods of operation. During periods of rich (or stoichiometric) operation, the catalyst component of the catalyst/NO$_x$ sorbent promotes the reduction of NO$_x$ to nitrogen by reaction of NO$_x$ (including NO$_x$ released from the NO$_x$ sorbent) with hydrocarbon (HC), carbon monoxide (CO), and/or hydrogen present in the exhaust.

Diesel engines provide better fuel economy than gasoline engines and normally operate 100% of the time under lean conditions, where the reduction of NO$_x$ is difficult due to the presence of excess oxygen. In this case, the catalyst/NO$_x$ sorbent is effective for storing NO$_x$. After the NO$_x$ storage mode, a transient rich condition must be utilized to release/reduce the stored NO$_x$ to nitrogen.

In a reducing environment, a lean NO$_x$ trap (LNT) activates reactions by promoting a steam reforming reaction of hydrocarbons and a water gas shift (WGS) reaction to provide H$_2$ as a reductant to abate NO$_x$. The water gas shift reaction is a chemical reaction in which carbon monoxide reacts with water vapor to form carbon dioxide and hydrogen. The presence of ceria in an LNT catalyzes the WGS reaction, improving the LNT's resistance to SO$_2$ deactivation and stabilizing the PGM.

The lean operating cycle is typically between 1 minute and 20 minutes and the rich operating cycle is typically short (1 to 10 seconds) to preserve as much fuel as possible. To enhance NO$_x$ conversion efficiency, the short and frequent regeneration is favored over long but less frequent regeneration.

The LNT catalyst operates under cyclic lean (trapping mode) and rich (regeneration mode) exhaust conditions during which the engine out NO is converted to N$_2$ as shown in equations 1-6:

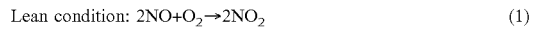
Lean condition: 2NO+O$_2$→2NO$_2$ (1)

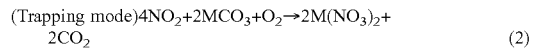
(Trapping mode)4NO$_2$+2MCO$_3$+O$_2$→2M(NO$_3$)$_2$+ 2CO$_2$ (2)

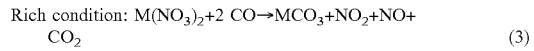
Rich condition: M(NO$_3$)$_2$+2 CO→MCO$_3$+NO$_2$+NO+ CO$_2$ (3)

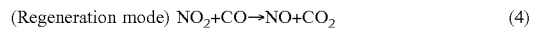
(Regeneration mode) NO$_2$+CO→NO+CO$_2$ (4)

2NO+2CO→N$_2$+2CO$_2$ (5)

2NO+2H$_2$→N$_2$+2H$_2$O (6)

In preparation for the emerging Euro 6 automotive exhaust emission catalyst market to meet increasingly stringent NO$_x$ emissions, diesel oxidation catalysts (DOC) for diesel passenger cars may be replaced with a close-coupled lean NO$_x$ trap with diesel oxidation functionality for engine displacements ranging from 1.2 to 2.5 L. In addition to managing NO$_x$ emissions from the vehicle, this change will require the LNTDOC to effectively oxidize engine-out hydrocarbon (HC) and carbon monoxide (CO) emissions. Specifically, this change requires that the LNT fulfill the de-NO$_x$ function of converting NO$_x$ to N$_2$ while also taking on the dual role of a DOC to oxidize engine-out hydrocarbons (HC) and carbon monoxide (CO) (Equations 7 and 8) and to generate an exotherm for the regeneration of a catalyzed soot filter (CSF).

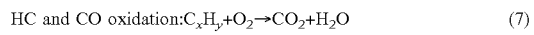
HC and CO oxidation:C$_x$H$_y$+O$_2$→CO$_2$+H$_2$O (7)

2CO+O$_2$→2CO$_2$ (8)

New legislation, such as the Diesel Euro 6b and Diesel Euro 6c legislation, requires a reduction in carbon dioxide (CO$_2$) emissions. To comply with such legislation, engine calibrations for light duty diesel applications will have to be implemented to obtain a reduction in carbon dioxide (CO$_2$) emissions. In practice, the reduction in CO$_2$ emission will result in a lower temperature in front of the carbon monoxide (CO) and hydrocarbon (HC) oxidation catalysts during driving cycle in vehicles using such catalysts. For systems having a lean NO$_x$ trap (LT-LNT) composition that stores NO$_x$ before the SCR light-off to result in lower NO$_x$ emissions, the removal of the stored NO$_x$ and conversion to N$_2$ at lower temperatures is a challenge.

In addition in some countries, new On-Board Diagnostic (OBD) regulations require that the Diesel Oxidation Catalysts (DOC) function (mainly HC conversion) in a DOC-SCR system to be monitored during driving. At present, there is no working DOC monitoring method available which can monitor the aging state of a DOC because there is no existing HC sensor. Therefore, it would be desirable to provide a DOC composition that can provide OBD capability.

SUMMARY

A first embodiment pertains to a lean burn engine exhaust treatment article comprising a low temperature lean NO$_x$ trap (LT-LNT) composition including a washcoat layer on a carrier substrate, the washcoat layer including a platinum group metal component impregnated on a first support material comprising at least 50% alumina, the washcoat layer further including a low temperature $NO_x$ storage material comprising a bulk particulate reducible metal oxide.

According to a second embodiment, the first embodiment is modified such that the first support material comprises 100% alumina.

According to a third embodiment, the first embodiment is modified such that the reducible metal oxide material comprises 100% ceria.

According to a fourth embodiment, the first embodiment is modified such that first support material consists essentially of ceria and alumina.

According to a fifth embodiment, the fourth embodiment is modified such that first support material comprises 20-50% by weight ceria and 50-80% by weight alumina.

According to a sixth embodiment, any of the fourth and fifth embodiments are modified such that the ceria and alumina are present in a ratio of 30:70 of ceria to alumina.

According to a seventh embodiment, any of the third through sixth embodiments are modified such that the ceria and alumina are present in a ratio of 50:50 of ceria to alumina.

According to an eighth embodiment, any of the first through seventh embodiments are modified such that the reducible metal oxide is one or more of $CeO_2$, $MnO_2$, $Mn_2O_3$, $Fe_2O_3$, CuO, or CoO and mixtures thereof.

According to an ninth embodiment, any of the first through eighth embodiments are modified such that the first support material further comprises one or more dopants selected from oxides of La, Zr, Nb, Pr, Y, Nd, or Sm.

According to a tenth embodiment, any of the first through ninth embodiments are modified such that the platinum group metal is platinum and palladium.

According to an eleventh embodiment, any of the first through tenth embodiments can be modified such that the washcoat layer further comprises Rh on a second support material comprising a reducible metal oxide, alumina, zirconia, and mixtures thereof.

According to a twelfth embodiment, any of the first through eleventh embodiments are modified such that the second support material comprises zirconia in the range of 5 to 50% by weight and greater than 50% by weight of reducible metal oxide.

According to a thirteenth embodiment, any of the first through twelfth embodiments are modified such that the reducible metal oxide is ceria, wherein the alumina and ceria are present in the LT-LNT composition in a ratio of alumina:ceria in a range of 4:1 to 1:3, and more specifically in a range of 1:1 to 1:3, and even more specifically in a range of 1:1 to 1:2.

According to a fourteenth embodiment, any of the first through thirteenth embodiments are modified such that the LT-LNT composition is disposed as a washcoat on a substrate, and the alumina is present in the range of 1 to 4 $g/in^3$, and more specifically in a range of 1 to 3 $g/in^3$.

According to a fifteenth embodiment, any of the first through fourteenth embodiments are modified such that Pt is present in the range of 20 to 200 $g/ft^3$, palladium is present in the range of 1 to 50 $g/ft^3$, and Rh is present on the second support in the range of 0 to 20 $g/ft^3$. According to an sixteenth embodiment, any of the first through fourteenth embodiments are modified such that is platinum is present in the range of 20 to 200 $g/ft^3$, palladium is present in the range of 4 to 30 $g/ft^3$, and Rh is present on the second support in the range of 2 to 10 $g/ft^3$. According to an seventeenth embodiment, any of the first through fourteenth embodiments are modified such that Pt is present in the range of 20 to 200 $g/ft^3$, palladium is present in the range of 5 to 20 $g/ft^3$, and Rh is present on the second support in the range of 3 to 7 $g/ft^3$.

According to an eighteenth embodiment, any of the first through fourteenth embodiments are modified such that Pt is present in the range of 40 to 150 $g/ft^3$, palladium is present in the range of 1 to 50 $g/ft^3$, and Rh is present on the second support in the range of 0 to 20 $g/ft^3$. According to an nineteenth embodiment, any of the first through fourteenth embodiments are modified such that Pt is present in the range of 40 to 150 $g/ft^3$, palladium is present in the range of 4 to 30 $g/ft^3$, and Rh is present on the second support in the range of 2 to 10 $g/ft^3$. According to a twentieth embodiment, any of the first through fourteenth embodiments are modified such that Pt is present in the range of 40 to 150 $g/ft^3$, palladium is present in the range of 5 to 20 $g/ft^3$, and Rh is present on the second support in the range of 4 to 7 $g/ft^3$.

According to a twenty-first embodiment, any of the first through fourteenth embodiments are modified such that Pt is present in the range of 60 to 130 $g/ft^3$, palladium is present in the range of 1 to 50 $g/ft^3$, and Rh is present on the second support in the range of 0 to 20 $g/ft^3$. According to a twenty-second embodiment, any of the first through fourteenth embodiments are modified such that Pt is present in the range of 60 to 130 $g/ft^3$, palladium is present in the range of 4 to 30 $g/ft^3$, and Rh is present on the second support in the range of 2 to 10 $g/ft^3$. According to a twenty-third embodiment, any of the first through fourteenth embodiments are modified such that Pt is present in the range of 60 to 130 $g/ft^3$, palladium is present in the range of 5 to 20 $g/ft^3$, and Rh is present on the second support in the range of 4 to 7 $g/ft^3$.

According to a twenty-fourth embodiment, any of the first through twenty-third embodiments are modified such that the LT-LNT composition is free of barium and other alkaline earth metals.

According to a twenty-fifth embodiment, a lean burn engine exhaust gas treatment system comprises the lean burn engine exhaust treatment article of any of the first through twenty-fourth embodiments, wherein the system further comprises a downstream selective catalytic reduction (SCR) catalyst.

According to a twenty-sixth embodiment, the twenty-fifth embodiment is modified such that the LT-LNT composition is disposed as a washcoat on a substrate and the SCR catalyst is disposed as a separate washcoat layer on a separate downstream substrate.

According to a twenty-seventh embodiment, any of the twenty-fifth through twenty-sixth embodiments are modified such that LT-LNT composition is on a honeycomb flow through substrate and the SCR catalyst is on a wall flow substrate. The SCR catalyst may also be coated on a flow through or wall-flow filter.

According to a twenty-eighth embodiment, any of the twenty-fifth through twenty-sixth embodiments are modified such that LT-LNT composition is on a wall flow substrate and the SCR catalyst is on a honeycomb flow through substrate.

According to a twenty-ninth embodiment, any of the first through twenty-eighth embodiments are modified such that the LT-LNT composition further comprises 1-10% by weight of an alkaline earth metal selected from the group Mg, Ca, Sr and Ba.

According to a thirtieth embodiment, any of the catalytic articles of the first through twenty-fourth and the twenty-ninth embodiments can be used in an exhaust gas system for a lean burn internal combustion engine.

According to a thirty-first embodiment, any of the catalytic articles of the first through twenty-fourth and the twenty-ninth embodiments can be used in a lean burn engine exhaust gas treatment system, the system further comprising a lambda sensor located downstream of the LT-LNT.

In a thirty-second embodiment, the thirty-second embodiment is modified such that the system further comprises a second lambda sensor located upstream of the LT-LNT, and the lambda sensor and second lambda sensor are in communication with an on board diagnostic system, which correlates deterioration of oxygen storage capacity of the LT-LNT with deteriorating HC conversion over the LT-LNT.

According to a thirty-third embodiment, a method of monitoring aging of a lean burn oxidation catalyst in a lean burn engine catalyst system is provided, the method comprising: passing a lean burn engine exhaust gas stream through the exhaust treatment article of any of the first through twenty-fourth and the twenty-ninth through thirty-third embodiments, wherein the method further comprises measuring degradation of the LT-LNT composition located in the path of the exhaust gas stream; and correlating the degradation of the LT-LNT composition with a decrease in hydrocarbon conversion efficiency of the lean burn oxidation catalyst.

According to a thirty-fourth embodiment, the thirty-third embodiment is modified such that the step of measuring degradation of the LT-LNT composition comprises monitoring the exhaust gas stream for $H_2$ content during a rich deNO$_x$ purge at 250° C. with a lambda sensor upstream of the LT-LNT and a second lambda sensor downstream of the LT-LNT.

According to a thirty-fifth embodiment, the thirty-third embodiment is modified such that the step of measuring degradation of the LT-LNT composition comprises monitoring the exhaust gas stream for $NH_3$ content during a rich purge with a $NH_3$ sensor downstream of the LT-LNT.

According to a thirty-sixth embodiment, the thirty-third embodiment is modified such that the step of measuring degradation of the LT-LNT composition comprises monitoring NO$_x$ storage with a NO$_x$ sensor during a lean period after a rich purge.

According to a thirty-seventh embodiment, the thirty-third embodiment is modified such that the step of measuring degradation of the LT-LNT composition comprises monitoring NO$_x$ slip with a NO$_x$ sensor during a rich purge following a NO$_x$ storage phase.

DETAILED DESCRIPTION

Figure 1:
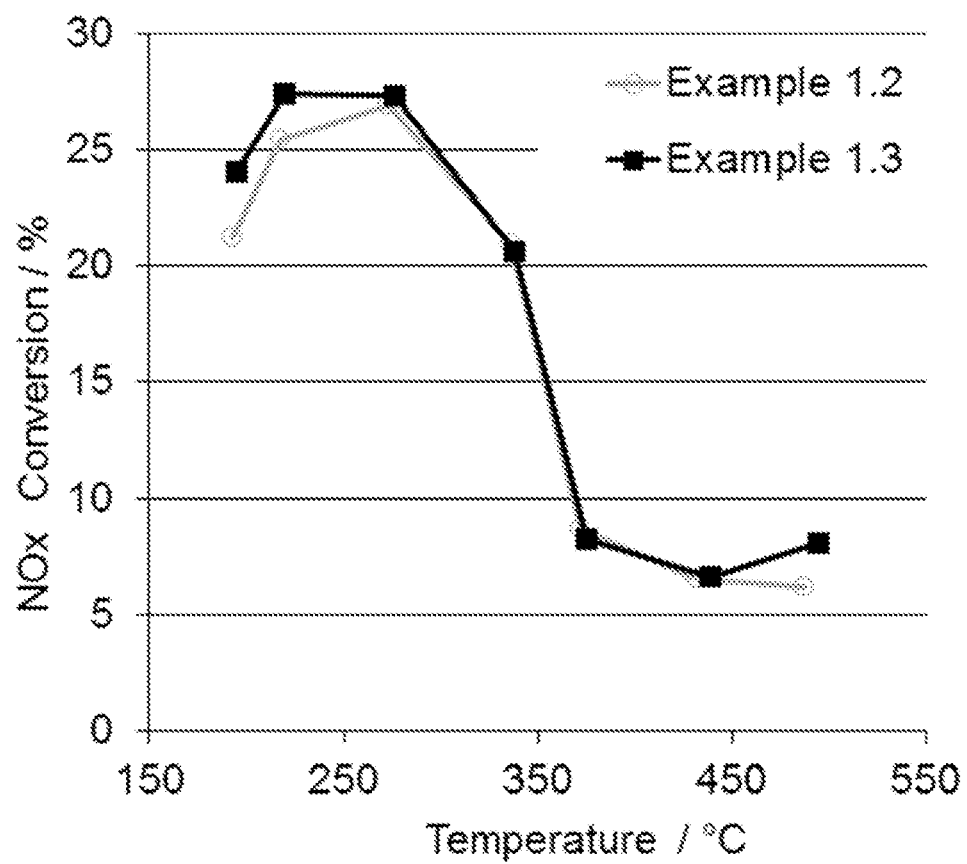
FIG. 1 shows a comparison of an average NO$_x$ conversion of an LT-LNT of the present invention and a prior art LNT over the last 5 cycles of the 7 cycle lean rich test.

Before describing several exemplary embodiments of the invention, it is to be understood that the invention is not limited to the details of construction or process steps set forth in the following description. The invention is capable of other embodiments and of being practiced or being carried out in various ways.

According to one or more embodiments of the invention, a low temperature lean NO$_x$ trap (LT-LNT) composition is provided. In one aspect, according to one or more embodiments, the LT-LNT composition has a relatively low CO and HC light-off temperature after a standard LNT rich deNO$_x$ event, in addition to providing a high conversion of NO to $NO_2$, which is desirable for a downstream SCR catalyst. The downstream SCR catalyst can be on a flow through substrate or on a wall flow filter substrate.

In one or more embodiments, the low temperature lean NO$_x$ trap (LT-LNT) compositions comprises a washcoat layer on a carrier substrate, the washcoat layer including a platinum group metal component impregnated on a first support material comprising at least 50% alumina. In one or more embodiments, the washcoat layer may further include a low temperature NO$_x$ storage material comprising a bulk particulate reducible metal oxide. According to one or more embodiments of the invention, lean burn engine exhaust gas treatment including the lean burn engine exhaust treatment articles comprising a low temperature lean NO$_x$ trap (LT-LNT) composition and methods for their use are also provided. According to one or more embodiments of the invention, methods for monitoring aging state of a lean burn oxidation catalyst in a lean burn engine catalyst system are also provided.

It has been discovered that lean burn engine exhaust treatment articles comprising a low temperature lean NO$_x$ trap (LT-LNT) compositions as disclosed herein have a very low carbon monoxide (CO) and hydrocarbon (HC) light-off after a standard LNT rich deNOx event, as well as, a high NO to $NO_2$ oxidation function which is desired for high selective catalytic reduction (SCR) performance. High CO and HC performance was also observed after rich deNO$_x$ for the low temperature lean NO$_x$ trap (LT-LNT) compositions disclosed herein.

In addition, it has been discovered that the catalytic compositions disclosed herein according to one or more embodiments can be implemented in a system with downstream sensors, such as lambda, $H_2$, $NH_3$, NO$_x$, etc. sensor to provide on board diagnostic functionality.

With respect to the terms used in this disclosure, the following definitions are provided.

Reference to a "support" in a washcoat layer refers to a material that receives precious metals, stabilizers, dopants, promoters, binders, and the like through association, dispersion, impregnation, or other suitable methods. Useful catalytic supports can be made of high surface area refractory oxide supports. Useful high surface area supports include one or more refractory oxides selected from alumina, titania, silica and zirconia. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or activated alumina family, such as gamma and eta aluminas, and, if present, a minor amount of other refractory oxide, e.g., about up to 20 weight percent.

As used herein, the term "alkaline earth metal" refers to one or more chemical elements defined in the Periodic Table of Elements, including beryllium (Be), magnesium (Mg), calcium (Ca), strontium (Sr), barium (Ba), and radium (Ra). In one or more embodiments, the alkaline earth metal component comprises a barium component. In a specific embodiment, the barium is applied as barium oxide. The alkaline earth metal component can be present in the washcoat in an amount in the range of about 0.5% to 10% by weight on an oxide basis. In a specific embodiment, the alkaline earth metal component comprises a magnesium and barium component. In a specific embodiment, the alkaline earth metal component comprises a barium component. In a very specific embodiment, the alkaline earth metal component comprises a barium component, which is present in an amount in the range of about 0.5% to about 2% by weight on an oxide basis.

As used herein, the term "platinum group metal" or "PGM" refers to one or more chemical elements defined in the Periodic Table of Elements, including platinum, palladium, rhodium, osmium, iridium, and ruthenium, and mixtures thereof. In one or more embodiments, the platinum group metal is selected from the group consisting of platinum, palladium, rhodium, iridium, and mixtures thereof. In a specific embodiment, the platinum group metal is selected from platinum, palladium, rhodium, and mixtures thereof. As will be apparent to those of ordinary skill in the art, the platinum group metal components, acting as catalytic agents, can exist in the catalyst in multiple oxidation states while in use. By way of example, a palladium component can exist as palladium metal, Pd (II), and Pd (IV) in the catalyst. According to one method of preparing the catalyst, a platinum group metal component such as a suitable compound and/or complex of the platinum group metals can be utilized to achieve dispersion of the catalytic component on a support, e.g., activated alumina support particles. As used herein, the term "platinum group metal component" means any platinum group metal compound, complex, or the like which, upon calcination or use of the catalyst decomposes or otherwise converts to a catalytically active form, usually, the metal or the metal oxide. Water soluble compounds or water dispersible compounds or complexes of platinum group metals can be utilized as long as the liquid used to impregnate or deposit the catalytic metal compounds onto support particles does not adversely react with the catalytic metal or its compound or complex or the other components of the catalyst composition and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds of the platinum group metals are preferred. For example, suitable compounds are chloroplatinic acid, amine solubilized platinum hydroxide, palladium nitrate or palladium chloride, rhodium chloride, rhodium nitrate, hexamine rhodium chloride, and the like. During the calcination step, or at least during the initial phase of use of the catalyst, such compounds are converted into a catalytically active form of the platinum group metal or a compound thereof.

Embodiments of a first aspect of the invention are directed to a lean burn engine exhaust treatment article comprising a low temperature lean $NO_x$ trap (LT-LNT) composition. In one or more embodiments, the low temperature lean $NO_x$ trap (LT-LNT) composition comprises a washcoat layer on a carrier substrate, the washcoat layer including a platinum group metal component impregnated on a first support material comprising at least 50% alumina. In one or more embodiments, the first support material comprises 100% alumina. In one or more embodiments, the first support material consists essentially of ceria and alumina. In one or more embodiments, the first support material comprises 20-50% by weight ceria and 50-80% by weight alumina. In one or more embodiments, the ceria and alumina are present in a ratio of 30:70 of ceria to alumina. In one or more embodiments, the ceria and alumina are present in a ratio of 50:50 of ceria to alumina.

The washcoat layer further includes a low temperature $NO_x$ storage material comprising a bulk particulate reducible metal oxide. In one or more embodiments, the reducible metal oxide is $CeO_2$, $MnO_2$, $Mn_2O_3$, $Fe_2O_3$, CuO, or CoO. In one or more embodiments, the reducible metal oxide is 100% ceria. According to one or more embodiments, the platinum group metal is not directly impregnated on the low temperature $NO_x$ storage material comprising a bulk particulate reducible metal oxide. In one or more embodiments, the platinum group metal comprises platinum and palladium. In one or more embodiments, the low temperature lean $NO_x$ trap (LT-LNT) composition contains Pt or Pt/Pd on alumina together with a bulk particulate reducible metal oxide in at least one layer of the low temperature lean $NO_x$ trap (LT-LNT) composition. In one or more specific embodiments, the bulk particulate reducible metal oxide is ceria. In one or more specific embodiments wherein the bulk particulate reducible metal oxide is ceria, the particles of ceria are admixed with particles of activated alumina so that the ceria is present in solid or bulk form as opposed to, for example, impregnating alumina particles with a solution of ceria compound which upon calcination is converted to ceria disposed within the alumina particles. In one or more very specific embodiments, the first support is doped with one or more of an oxide of Y, Nd, Sm, Zr, Nb, La and Pr. In one or more embodiments, first support material can also include alumina and dopants including, but not limited to, an oxide of Y, Nd, Sm, Zr, La, Nb, and Pr.

In one or more embodiments, the first support material and the low temperature $NO_x$ storage material comprising a bulk particulate reducible metal oxide have different compositions. In other embodiments, the first support material and the low temperature $NO_x$ storage material comprising a bulk particulate reducible metal oxide have the same composition.

As discussed above, the platinum group metal can be selected from the group consisting of platinum, palladium, rhodium, iridium, and mixtures thereof. In a specific embodiment, the platinum group metal is selected from platinum, palladium, and mixtures thereof. In a more specific embodiment, the platinum group metal is selected from platinum, palladium, rhodium, and mixtures thereof. In one or more embodiments, the platinum group metal component includes one or more of Pt and Pd. In one or more specific embodiments, the platinum group metal component includes Pt and Pd.

In one or more embodiments, the washcoat layer further comprises Rh on a second support material. In one or more embodiments, Rh is present in the range of 0 to 20 $g/ft^3$ on the second support. In one or more embodiments, Rh is present in the range of 2 to 10 $g/ft^3$ on the second support. In one or more embodiments, Rh is present in the range of 3 to 7 g/ft³ on the second support. In one or more embodiments, the washcoat layer further comprises Rh on a second support material comprising a reducible metal oxide, alumina and a compound derived from zirconium, preferably zirconium oxide. The zirconium compound can be provided as a water soluble compound such as zirconium acetate or as a relatively insoluble compound such as zirconium hydroxide, both of which upon calcining are converted to the oxide. There should be an amount sufficient to enhance the stabilization and promotion of the catalytic washcoat compositions. In a specific embodiment, the second support material comprises in the range of 50 to 95% by weight reducible metal oxide and zirconia in the range of 5 to 50% by weight.

In one or more embodiments, the second support material consisting essentially of ceria and alumina. In one or more embodiments, the second support material comprises 20-50% by weight ceria and 50-80% by weight alumina. In one or more embodiments, the second support material comprises ceria and alumina which are present in a ratio of 30:70 of ceria to alumina. In one or more embodiments, the second support material comprises ceria and alumina which are present in a ratio of 50:50 of ceria to alumina. In one or more specific embodiments, the refractory metal oxide on the second support is doped with one or more of an oxide of Mg, Mn and Zr. In one or more very specific embodiments, the refractory metal oxide is doped with one or more of an oxide of Mg and Zr.

In one or more embodiments, the reducible metal oxide is ceria, and the alumina and ceria are present in the LT-LNT composition in a ratio of alumina: ceria in a range of 4:1 to 1:4. In one or more specific embodiments, the alumina and ceria are present in the LT-LNT composition in a ratio of alumina: ceria in a range of 1:1 to 1:4. In one or more very specific embodiments, the alumina and ceria are present in the LT-LNT composition in a ratio of alumina: ceria in a range of 1:1 to 1:3. In one or more embodiments, the LT-LNT composition is disposed as a washcoat on a substrate, and the alumina is present in the range of 1 to 4 g/in³.

In one or more embodiments, the LT-LNT composition is free of barium and other alkaline earth metals. In one or more embodiments, the LT-LNT composition may further comprise 1-10% by weight of a barium compound.

Typically, the low temperature lean $NO_x$ trap (LT-LNT) composition of the present invention is disposed on a substrate. The substrate may be any of those materials typically used for preparing catalysts, and will typically comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to herein as flow-through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc.

The lean $NO_x$ trap washcoat compositions according to embodiments of the present invention can be applied to the substrate surfaces by any known means in the art. For example, the catalyst washcoat can be applied by spray coating, powder coating, or brushing or dipping a surface into the catalyst composition.

The duration of the rich activation for the one or more embodiments of the low temperature lean $NO_x$ trap (LT-LNT) compositions disclosed herein are significantly shorter compared to standard LNTs and can be applied at lower temperatures. One or more embodiments of the low temperature lean $NO_x$ trap (LT-LNT) compositions can conduct removal of stored sulfur at lower temperatures compared to a standard LNT. In one or more embodiments of the low temperature lean $NO_x$ trap (LT-LNT) compositions, $NO_x$ is thermally desorbed between 200 and 300° C. which ensures an empty low temperature lean $NO_x$ trap (LT-LNT) when the engine is stopped, giving high $NO_x$ adsorption for the next start.

The low temperature lean $NO_x$ trap (LT-LNT) compositions according to embodiments of the present invention provide high CO and HC performance and also have a significant PGM cost reduction potential compared to Pt/Pd DOC and LT-LNT technologies currently available.

The low temperature lean $NO_x$ trap (LT-LNT) compositions described herein comprising a washcoat layer including a platinum group metal component impregnated on a first support material comprising at least 50% alumina, the washcoat layer further including a low temperature $NO_x$ storage material comprising a bulk particulate reducible metal oxide can be incorporated into a DOC as an additional washcoat layer with a DOC washcoat layer, which will be referred to herein as a LT-LNT/DOC catalyst. Alternatively, the low temperature lean $NO_x$ trap (LT-LNT) compositions described herein can be incorporated as part of an active DOC washcoat layer to provide a LT-LNT/DOC catalyst.

Another aspect of the invention pertains to systems that utilize the low temperature lean $NO_x$ trap (LT-LNT) compositions described herein. In one embodiment of a system, a low temperature lean $NO_x$ trap (LT-LNT) composition is provided on a first substrate, and a selective catalytic reduction (SCR) catalyst is provided downstream of the LT-LNT composition. The SCR catalyst can be provided on a flow through honeycomb substrate or on a wall flow substrate. The LT-LNT composition can be provided on a flow through honeycomb substrate or on a wall flow substrate.

Suitable SCR catalyst compositions for use in the system are able to effectively catalyze the reduction of the $NO_x$ component, so that adequate $NO_x$ levels can be treated even under conditions of low load which typically are associated with lower exhaust temperatures. In one or more embodiments, the catalyst article is capable of converting at least 50% of the $NO_x$ component to $N_2$, depending upon the amount of reductant added to the system. In addition SCR catalyst compositions for use in the system are also ideally able to aid in the regeneration of the filter by lowering the temperature at which the soot fraction of the particulate matter is combusted. Another desirable attribute for the composition is that it possesses the ability to catalyze the reaction of $O_2$ with any excess $NH_3$ to $N_2$ and $H_2O$, so that $NH_3$ is not emitted into the atmosphere.

SCR catalyst compositions should resist degradation upon exposure to sulfur components, which are often present in diesel exhaust gas compositions and should have an acceptable hydrothermal stability in line with the required regeneration temperatures.

Suitable SCR catalyst compositions are described, for instance, in U.S. Pat. No. 5,300,472 (the '472 patent), U.S. Pat. No. 4,961,917 (the '917 patent) and U.S. Pat. No. 5,516,497 (the '497 patent), which are hereby incorporated by reference in their entirety. Compositions disclosed in the '472 patent include, in addition to titanium dioxide, at least one oxide of tungsten, silicon, boron, aluminum, phosphorus, zirconium, barium, yttrium, lanthanum, or cerium, and at least one oxide of vanadium, niobium, molybdenum, iron, or copper. Compositions disclosed in the '917 patent include one or both of an iron and a copper promoter present in a zeolite in an amount of from about 0.1 to 30 percent by weight, a specific example being from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations. In specific embodiments, the SCR catalyst comprises a molecular sieve. In various embodiments, the molecular sieve may have a zeolitic framework, and the zeolitic framework may have ring sizes no larger than 12. In one or more embodiments, the zeolitic framework material comprises a double-six ring (d6r) unit.

In one or more embodiments, the zeolitic framework material may be selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In various embodiments, the zeolitic framework material may be selected from AEI, CHA, AFX, ERI, KFI, LEV, and combinations thereof. In various embodiments, the zeolitic framework material may be selected from AEI, CHA, and AFX. In various embodiments, the zeolitic framework material is CHA.

In one or more embodiments, the SCR catalyst further comprises a metal, which may be a base metal. In various embodiments, the base metal, precious metal, or combination thereof, may promote catalytic activity of the zeolitic framework material.

In various embodiments, the selective catalytic reduction catalyst is promoted with a metal selected from Cu, Fe, Co, Ni, La, Ce, and Mn, and combinations thereof. In various embodiments, the selective catalytic reduction catalyst is promoted with a metal selected from Cu, Fe and combinations thereof. In one or more embodiments, the zeolitic framework material is CHA promoted with copper and/or iron.

In embodiments that have a downstream SCR catalyst the low temperature lean $NO_x$ trap (LT-LNT) composition stores $NO_x$ at a temperature below 300° C., and thermally desorbs $NO_x$ at a temperature above 300° C. According to one or more embodiments, the stored $NO_x$ is converted under rich condition to $N_2$ below 300° C.

According to one or more embodiments, a system utilizing a combined low temperature lean $NO_x$ trap (LT-LNT) composition upstream from a SCR catalyst is useful when the temperature of the SCR catalyst is too low for $NO_x$ conversion by the SCR catalyst. In addition, the low temperature lean $NO_x$ trap (LT-LNT) composition adsorbs low levels of $NO_x$ when the SCR catalyst is active at higher temperatures, e.g. greater than 300° C. Thus, the addition of combined low temperature lean $NO_x$ trap (LT-LNT) trap upstream of a SCR catalyst significantly improves the lower temperature activity of an SCR system.

It will be understood that such a system may also include a suitable reductant introduction system such as an aqueous urea reservoir which stores a urea/water solution aboard the vehicle which is pumped through a pump including a filter and pressure regulator to a urea injector. The urea injector can include nozzle which injects atomized urea/water/air solution upstream from the SCR catalyst. Other suitable reductant introduction system can include a urea or cyanuric acid prill injector can meter solid pellets of urea to a chamber heated by the exhaust gas to gasify the solid reductant (sublimation temperature range of about 300 to 400° C.). Other nitrogen based reducing reagents or reductants especially suitable for use in the control system of the present invention includes ammelide, ammeline, ammonium cyanate, biuret, cyanuric acid, ammonium carbamate, melamine, tricyanourea, and mixtures of any number of these. However, the invention in a broader sense is not limited to nitrogen based reductants but can include any reductant containing hydrocarbons such as distillate fuels including alcohols, ethers, organo-nitro compounds and the like (e.g., methanol, ethanol, diethyl ether, etc.) and various amines and their salts (especially their carbonates), including guanidine, methyl amine carbonate, hexamethylamine, etc.

In another system embodiment, the low temperature lean $NO_x$ trap (LT-LNT) compositions described herein can be utilized in a system upstream from catalyzed soot filter (CSF) catalyst with a platinum group metal component. The CSF catalyst can be incorporated or coated onto a filter, for example, a wall flow filter. The low temperature lean $NO_x$ trap (LT-LNT) composition combined with a DOC composition described above. The LT-LNT in combination with a DOC can be placed upstream of a CSF, which can be placed upstream of a SCR catalyst having an upstream reductant injector as described above. Thus, an embodiment of a system would comprise an LT-LNT/DOC composition upstream of PGM catalyzed CSF that is upstream of a reductant injector and upstream of a SCR catalyst as described above. In embodiments in which the LT-LNT includes Pt/Pd on a support comprising alumina along with a ceria component, the interaction of the Pt/Pd on alumina and ceria improves the light-off of the DOC. A short rich purge of about 5 seconds at 300° C. at an air fuel ratio of 0.95 can be used after the filter regeneration. In an alternate embodiment, the LT-LNT having a high CO and HC performance may be placed as a separate layer in a DOC formulation to introduce OBD functionality and additionally to improve the CO and HC light-off. However, in such an embodiment, the engine has to go under a rich ($DeNO_x$) condition for activation of the LT-LNT.

In yet another system embodiment, a lean burn engine exhaust gas treatment system comprises a lambda sensor located downstream of the LT-LNT combined with a DOC composition. In one or more embodiments, the lambda sensor is in communication with an on board diagnostic system. In one embodiment, the delay time of the lambda signal between two lambda sensors is measured. In one or more embodiments, one lambda sensor is upstream of the LT-LNT combined with a DOC composition and one lambda sensor is downstream of the LT-LNT combined with a DOC composition. Deterioration of the oxygen storage capacity of the DOC can be correlated with hydrocarbon and carbon monoxide conversion deterioration of the LT-LNT/DOC catalyst when switching from lean to rich or rich to lean. The lambda sensors used can be any suitable lambda sensors, for example, heated exhaust gas oxygen (HEGO) or universal exhaust gas oxygen (UEGO) sensors.

Either the delay time or the area between inlet and outlet signal can be measured.

In the case of the delay time, the oxygen amount is given by the following formula:

$$OSC[mg] = \Delta\lambda * Flow[kg/h] * Dt[s] * 0.64 \qquad (1),$$

where OSC [mg] is the mass of oxygen released by the oxygen storage component upon transition from lean to rich engine operating conditions, $\Delta\lambda$ is the difference in lambda values measured before and after the DOC, Flow denotes the intake air mass flow, and Δt is the time delay between the lambda jump in front of and behind the catalyst measured upon transition from lean to rich.

Alternatively, the lambda signals can be integrated in order to calculate the mass of oxygen stored per catalyst unit volume using following formula:

$$O_2[g/l_{catalyst}] = \frac{flow[l/min]}{60[sec/min]} \cdot \frac{\int_{\lambda_{in} \leq 1}^{\lambda_{out} \leq \lambda_{in}} \left(\frac{\lambda_{out}}{\lambda_{in}} - 1\right) dt}{catalyst\ volume[l_{catalyst}]} \cdot 0.23 \cdot \rho_{air}[g/l], \quad (2)$$

where $\rho_{air}$ is the density of air, and flow denotes the intake air mass flow, and $\lambda_{in}$ and $\lambda_{out}$ denote the lambda values measured in front of and behind the DOC.

According to another embodiment of the invention, a LT-LNT/DOC catalyst as described according to one or more embodiments is placed upstream from a first hydrogen sensor, which measures $H_2$ formation during a rich cycle, which is used to purge the LT-LNT/DOC catalyst. An OBD system monitors the $H_2$ values measured by the first hydrogen sensor. A target value, determined from the water gas shift (WGS) reaction is used to determine if the OBD should provide a warning or alarm.

According to another embodiment of the invention, a LT-LNT/DOC catalyst as described according to one or more embodiments is placed upstream from a first $NH_3$ sensor, which measures $NH_3$ formation during a rich cycle, which is used to purge the LT-LNT/DOC catalyst. An OBD system monitors the $NH_3$ values measured by the first $NH_3$ sensor. A target value, determined from a predetermined target $NH_3$ value based upon the amount of $NH_3$ formed by the reaction $NO_x$ and $H_2$ is used to determine if the OBD should provide a warning or alarm.

According to another embodiment of the invention, a LT-LNT/DOC catalyst as described according to one or more embodiments is placed upstream from a first $NO_x$ sensor, which measures $NO_x$ storage at low temperatures during a lean period after a rich period to purge the catalyst. Specifically, a $NO_x$ sensor upstream and a $NO_x$ sensor downstream of the LT-LNT/DOC catalyst measure the $NO_x$ storage on the LT-LNT/DOC catalyst. The amount of $NO_x$ adsorbed is correlated to the performance of the DOC with respect to hydrocarbon (HC), carbon monoxide (CO) and conversion of NO to $NO_2$.

Additionally, in one or more embodiments, a first $NO_x$ sensor placed downstream from the LT-LNT/DOC catalyst measures $NO_x$ slip with a $NO_x$ sensor during a rich period to purge the catalyst at low temperature after a $NO_x$ storage period. Stored $NO_x$ is released, and the conversion to $N_2$ is a function of the LT-LNT/DOC catalyst deterioration. Specifically, after $NO_x$ storage, a rich $deNO_x$ purge is applied. The amount of $NO_x$ released, as result of not being converted to $N_2$, is correlated to the performance of the DOC with respect to hydrocarbon (HC), carbon monoxide (CO) and conversion of NO to $NO_2$. An OBD system monitors the $NO_x$ values measured by the first $NO_x$ sensor. A target value, determined from a predetermined target $NO_x$ value based upon the amount of $NO_x$ exiting the LT-LNT/DOC catalyst.

In one or more embodiments, a method of monitoring aging of a lean burn oxidation catalyst in a lean burn engine catalyst system comprises passing a lean burn engine exhaust gas stream of a diesel engine through a LT-LNT catalyst composition as described herein; measuring degradation of the LT-LNT composition located in the path of the exhaust gas stream; and correlating the degradation of the LT-LNT composition with a decrease in hydrocarbon conversion efficiency of the lean burn oxidation catalyst. In one or more embodiments, the lean burn engine catalyst system further comprises an oxygen storage component (OSC). In one or more embodiments, the amount of oxygen storage component (OSC) is present in an amount sufficient so that the catalyst's deterioration in its oxygen storage capacity can be correlated with the deterioration in the diesel oxidation catalyst's ability to convert hydrocarbons and/or carbon monoxide. The oxygen storage capacity of the OSC can be measured by applying a pulse of rich exhaust gas and determining the time lag of the lambda response measured in front of (upstream) and behind (downstream) the diesel oxidation catalyst (DOC). For example, when the DOC's ability to reduce hydrocarbons or carbon monoxide in the exhaust stream falls below a certain predetermined or preselected level, there is also a decrease in the delay time between the lambda signals measured upstream and downstream of the catalyst which is detected by the OBD system due to the deteriorated oxygen storage capacity. The oxygen storage component may have a pre-selected deactivation temperature range that coincides with a deactivation temperature range of the precious metal component at which the hydrocarbon conversion of the precious metal component decreases below a pre-selected value. This correlation can therefore be achieved by calibration of the deterioration of the OSC with the deterioration of the diesel catalyst performance. The OBD system can then provide a signal or alarm to the vehicle operator indicating the need for exhaust system maintenance. In one or more embodiments, the interaction of the PGM with the reducible metal oxide, e.g., a ceria compound, is produced by adding the PGM impregnated alumina together with the reducible metal oxide in a slurry. The subsequent slurry was milled to a particle size d90 of 9 μm. The final slurry is subsequently coated onto a metallic flow through substrate. Thus, the interaction between the PGM and OSC is not a direct interaction by impregnating the reducible metal oxide with PGM but an indirect interaction produced by milling the PGM with OSC in a slurry.

In a reducing environment, a lean $NO_x$ trap (LNT) activates reactions by promoting a steam reforming reaction of hydrocarbons and a water gas shift (WGS) reaction to provide hydrogen ($H_2$) as a reductant to abate $NO_x$. The water gas shift reaction is a chemical reaction in which carbon monoxide reacts with water vapor to form carbon dioxide and hydrogen. In one or more embodiments, the step of measuring degradation of the LT-LNT composition comprises monitoring the exhaust gas stream for $H_2$ content during a rich purge at 250° C. with a lambda sensor. In one or more embodiments, a first lambda sensor may be located upstream of the diesel oxidation catalyst (DOC) and a second lambda sensor may be located downstream from the DOC. According to one or more embodiments, the first lambda sensor and second lambda sensor are in communication with an on board diagnostic system (OBD). In one or more embodiments, the DOC may provide OBD functions wherein the delay time of the lambda signal between first lambda sensor located upstream and the second lambda sensor located downstream of the DOC can be used to measure degradation of an oxygen storage component located in the path of the exhaust gas stream; and correlating the degradation of the oxygen storage catalyst (OSC) with a decrease in hydrocarbon conversion efficiency. The OSC deterioration can be correlating with CO/HC deterioration when switching from lean to rich or rich to lean.

In one or more embodiments, the step of measuring degradation of the LT-LNT composition comprises monitoring the exhaust gas stream for $NH_3$ content during a rich purge with a $NH_3$ sensor. $NH_3$ formation from the DOC during rich treatment, as a result of a reaction of $NO_x$ and $H_2$, is measured by a $NH_3$ sensor. The lambda signal downstream of the DOC is lower than target value (from WGS reaction) when $H_2$ formation occurs during a rich purge.

In one or more embodiments, the method of monitoring aging state of a lean burn oxidation catalyst in a lean burn engine catalyst system further comprises activating an alarm when the hydrocarbon conversion efficiency decreases below a pre-selected value.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

1. Impact of Rh and PGM Support 1.1 Examples 1.1 to 1.3—LT-LNT vs. DOC and Rh Impact As shown below in Table 1, DOC is referred to as Sample 1.1 and represents a sample of a prior art DOC. LT-LNT A is referred to as Sample 1.2 and represents a sample of an LNT of the present invention. LT-LNT B is referred to as Sample 1.3 and also represents a sample of an LNT of the present invention.

TABLE 1

| Sample No. | Catalyst | PGM loading/g/ft$^3$ (Pt/Pd/Rh) | Layer | alumina:ceria ratio |
|---|---|---|---|---|
| 1.1 | DOC | 120 (60/60/0) | 3 | — |
| 1.2 | LT-LNT A | 55.5 (51/4.5/0) | 1 | 2.7 |
| 1.3 | LT-LNT B | 60 (51/4.5/4.5) | 1 | 2.7 |

Substrates 5.66 * 4" 400/4

Sample 1.1 Prior Art DOC

To prepare the first (bottom) layer of Sample 1.1, a Palladium nitrate solution was added to 0.75 g/in$^3$ high porous γ-alumina resulting in 22 g/ft$^3$ Pd. The resulting frit was dispersed in water and acid (e.g. acetic acid) and milled to a particle size d90 of 25 micrometer. Into this slurry, 0.75 g/in$^3$ OSC material ($ZrO_2$: 43.5 wt %, $CeO_2$: 45 wt %, $La_2O_3$: 8 wt %, $Pr_6O_{11}$: 2 wt %, $HfO_2$: 1.5%) was dispersed and milled to a particle size d90 of 7 micrometer. The final slurry was coated onto a monolith, dried at 110° C. air and calcined at 590° C. in air. To prepare the second (middle) layer of Sample 1.1, 1.5 g/in$^3$ of high porous γ-alumina was impregnated with an aqueous solution of Palladium nitrate giving a final dry Pd content of 30 g/ft$^3$. The resulting powder was dispersed in water. Platinum solution with Platinum as an ammine stabilized hydroxo Pt IV complex was added to give a dry content of Pt 60 g/ft$^3$. After adjusting the pH of the slurry to 4.5, the slurry was milled to a particle size d90 of 16 μm. The slurry is then subsequently coated onto the 1st layer, dried at 110° C. air and calcined at 590° C. in air.

To prepare the third (top) layer of Sample 1.1, 0.25 g/in3 high porous γ-alumina and 0.5 g/in$^3$ OSC material ($ZrO_2$: 43.5 wt %, $CeO_2$: 45 wt %, $La_2O_3$: 8 wt %, $Pr_6O_{11}$: 2 wt %, $HfO_2$: 1.5%) were mixed and impregnated with an aqueous solution of Palladium nitrate giving a final dry Pd content of 8 g/ft$^3$. Subsequently the impregnated material was dispersed in water and acid (e.g. acetic acid) and milled to a particle size d90 of 20 micrometer. 0.5 g/in3 H-beta zeolite was immersed in water to a solid content to 45%. The precious metal containing slurry was mixed with the H-Beta slurry, milled to a particle size d90 of 15 μm and subsequently coated onto the 2nd layer, dried at 110° C. air and calcined at 590° C. in air.

Sample 1.2 LT-LNT (Inventive)

To prepare Sample 1.2, which is an embodiment of the present invention, 3 g/in$^3$ of high porous γ-alumina was firstly impregnated with a Platinum solution with Platinum as an ammine stabilized hydroxo Pt IV complex to give a dry content of Pt 51 g/ft$^3$ and secondly with an aqueous solution of Palladium nitrate giving a final dry Pd content of 4.5 g/ft$^3$. The resulting powder with a solid content of 65-70% was dispersed in water. To this slurry 100% Ceria material (1.1 g/in$^3$); Magnesium acetate 4 hydrate (0.3 g/in$^3$) and Zirconium acetate (0.05 g/in$^3$) were added. The resulting slurry was milled to a particle size d90 of 9 μm. The final slurry is subsequently coated onto a ceramic flow through substrate. The coated substrate was dried at 110° C. air and calcined at 590° C. in air.

Sample 1.3 LT-LNT (Inventive)

To prepare Sample 1.3, which is an embodiment of the present invention, 3 g/in$^3$ of high porous γ-alumina was firstly impregnated with a Platinum solution with Platinum as an ammine stabilized hydroxo Pt IV complex to give a dry content of Pt 51 g/ft$^3$ and secondly with an aqueous solution of Palladium nitrate giving a final dry Pd content of 4.5 g/ft$^3$. The resulting powder with a solid content of 65-70% was dispersed in water.

For the Rh impregnation, 100% Ceria material (0.3 g/in$^3$) was dispersed into water to a solid content of 43%. A solution of Rh nitrate was added to the Ceria slurry giving a final dry Rh content of 4.5 g/ft$^3$.

The resulting Rh/Ceria slurry, 100% Ceria material (0.8 g/in$^3$), Magnesium acetate 4 hydrate (0.3 g/in$^3$) and Zirconium acetate (0.05 g/in$^3$) were added to the Pt/Pd/alumina slurry. The subsequent slurry was milled to a particle size d90 of 9 μm. The final slurry is subsequently coated onto a ceramic flow through substrate. The coated substrate is dried at 110° C. air and calcined at 590° C. in air.

New European Driving Cycle (NEDC) CO and HC Performance Evaluation

Samples 1.1-1.3 were tested on an engine test cell equipped with a Euro 6 2 L engine with 3 standard New European Driving Cycles (NEDC). Prior to testing, Samples 1.1-1.3 were aged for 15 hours at 750° C. under air flow with 10% water vapor. In case of the LT-LNT of Samples 1.2 and 1.3, a rich engine mode was applied at 1075s point in the NEDC for 7 s at Lambda 0.95. The CO and HC conversion over the samples were measured as shown in Table 2. The average temperature over the first 4 ECE cycles was 120° C. Higher conversions characterize a better gas activity.

TABLE 2

| Sample | CO upstream/ g/km | CO Conversion/% | HC upstream/ g/km | HC Conversion/% |
|---|---|---|---|---|
| NEDC Engine out emissions and conversion of the 3rd test cycle | | | | |
| 1.1 DOC (Comp) | 1.2 | 65 | 0.2 | 80 |
| 1.2 LT-LNT (Inv) | 1.5 | 72 | 0.25 | 69 |
| 1.3 LT-LNT (Inv) | 1.5 | 75 | 0.25 | 68 |

As shown in Table 2, the CO performance of the low PGM loaded LT-LNTs of Sample 1.2 and Sample 1.3 show equivalent performance compared to the DOC (Sample 1.1) with approximately twice the PGM amount. The HC performance of the DOC is higher because of the zeolite in the formulation.

Lean/Rich Cycle Test for DeNOx Performance Evaluation

Figure 2:
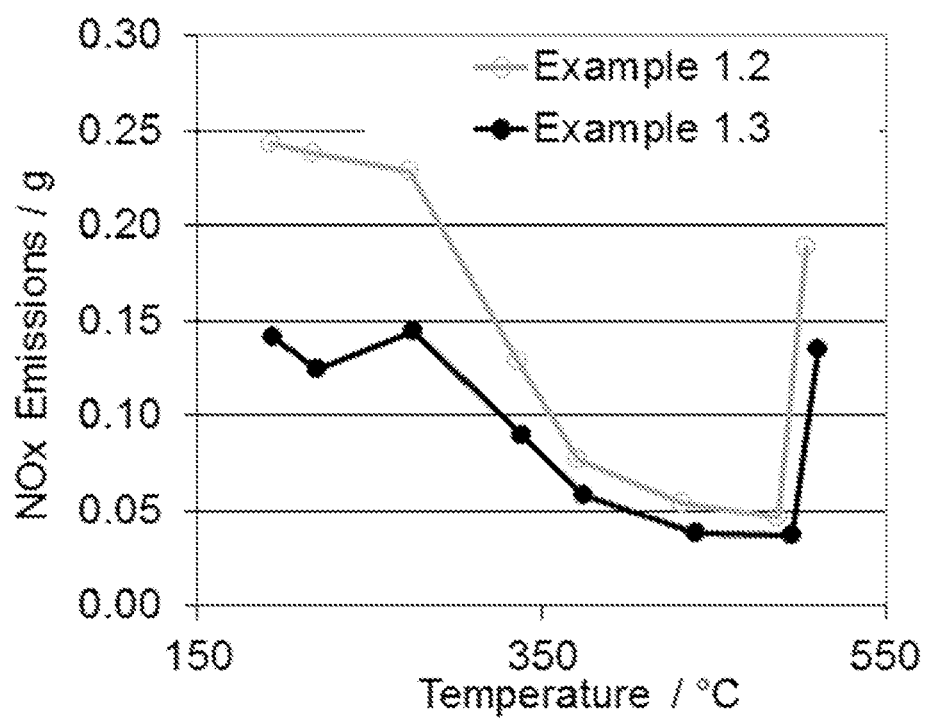
FIG. 2 shows a comparison of an average NO$_x$ emissions of an LT-LNT of the present invention and a prior art LNT during rich phase over the last 5 cycles of the 7 cycle lean rich test.

For $DeNO_x$ performance evaluation, a lean/rich cycle test was used. The lean/rich cycle test is an engine test consisting of seven lean/rich cycles conducted at 7 different pre-catalyst temperatures from 190° C. to 500° C. For each temperature at the start of the test, a rich operation of 30 seconds is conducted to assure all nitrates are desorbed from the LT-LNT. In the lean phase, $NO_x$ from the engine out is stored on the LT-LNT catalyst. After the lean phase, the engine goes into a rich mode for 10-15 second. During the rich mode, most of the stored $NO_x$ on the catalyst is converted to nitrogen. The average $NO_x$ conversion over the last 5 cycles and $NO_x$ emissions during the rich phase over the last 5 cycles is monitored and evaluated. FIG. 1 and FIG. 2 show the $NO_x$ conversion and $NO_x$ breakthrough of 16 h hydrothermally oven aged Samples 1.2 and 1.3. The Rh in Sample 1.3 reduces the $NO_x$ slip during the rich phase at temperatures lower than 300° C. and therefore increases the $NO_x$ conversion in the temperature range.

1.2 Examples 1.4 and 1.5—PGM Location

As shown below in Table 3, LT-LNT C is referred to as Sample 1.4 and represents a sample of an LNT of the present invention. LT-LNT D is referred to as Sample 1.5 and also represents a sample of a prior art LNT.

TABLE 3

| Sample No. | Catalyst | PGM loading/g/ft³ (Pt/Pd/Rh) | PGM support | Zeolite | alumina:ceria ratio |
|---|---|---|---|---|---|
| 1.4 | LT-LNT C | 55.5 (51/4.5/0) | Alumina | 0.5 g/in³ | 0.8 |
| 1.5 | LT-LNT D | 55.5 (51/4.5/0) | Ceria | 0.5 g/ft³ | 0.8 |

Substrates 5.66 * 4.5" 400/4

Sample 1.4 LT-LNT (Inventive)

To prepare Sample 1.4, which is an embodiment of the present invention, 2 g/in³ of high porous γ-alumina was firstly impregnated with a Platinum solution with Platinum as an ammine stabilized hydroxo Pt IV complex to give a dry content of Pt 51 g/ft³ and secondly with an aqueous solution of Palladium nitrate giving a final dry Pd content of 4.5 g/ft³. The resulting powder with a solid content of 65-70% was dispersed in water. To this slurry, 100% Ceria material (2.25 g/in³); Magnesium acetate 4 hydrate (0.3 g/in³) and Zirconium acetate (0.05 g/in³) was added and mixed. The resulting slurry was milled to a particle size d90 of 9 μm. H-Beta zeolite material (0.5 g/in³) was added to the milled slurry. The final slurry is subsequently coated onto a ceramic flow through substrate. The coated substrate is dried at 110° C. air and calcined at 590° C. in air.

Sample 1.5 Prior Art LT-LNT (Comparative)

To prepare Sample 1.5, which represents a sample of a prior art LT-LNT, 2.25 g/in³ of 100% Ceria material was firstly impregnated with a Platinum solution with Platinum as an ammine stabilized hydroxo Pt IV complex to give a dry content of Pt 51 g/ft³ and secondly with an aqueous solution of Palladium nitrate giving a final dry Pd content of 4.5 g/ft³. The resulting powder with a solid content of 65-70% was dispersed in water. To this slurry, high porous γ-alumina (2.0 g/in³); Magnesium acetate 4 hydrate (0.3 g/in³) and Zirconium acetate (0.05 g/in³) were added and mixed. The resulting slurry was milled to a particle size d90 of 9 μm. H-Beta zeolite material (0.5 g/in³) was added to the milled slurry. The final slurry is subsequently coated onto a ceramic flow through substrate. The coated substrate is dried at 110° C. air and calcined at 590° C. in air.

Light-Off Testing for CO and HC Performance Testing

The light-off performance of Samples 1.2, 1.4 and 1.5 was tested on an engine test cell. Prior to testing, the samples were firstly aged for 15 hours at 750° C. under air flow with 10% water vapor and then activated by a rich lambda purge at 300° C. for 10s on engine. For light-off testing each sample was placed downstream in the exhaust line from a 6 cylinder light duty diesel engine with 3 L displacement. The CO and HC concentration in the exhaust stream was constant at 1250 ppm and 200 ppm ($C_3$ basis), respectively. The gas flow under standard conditions was approximately 45 m³/h. The temperature ramp was 2° C./min.

A lower light-off temperature characterizes a better gas activity.

Figure 3:
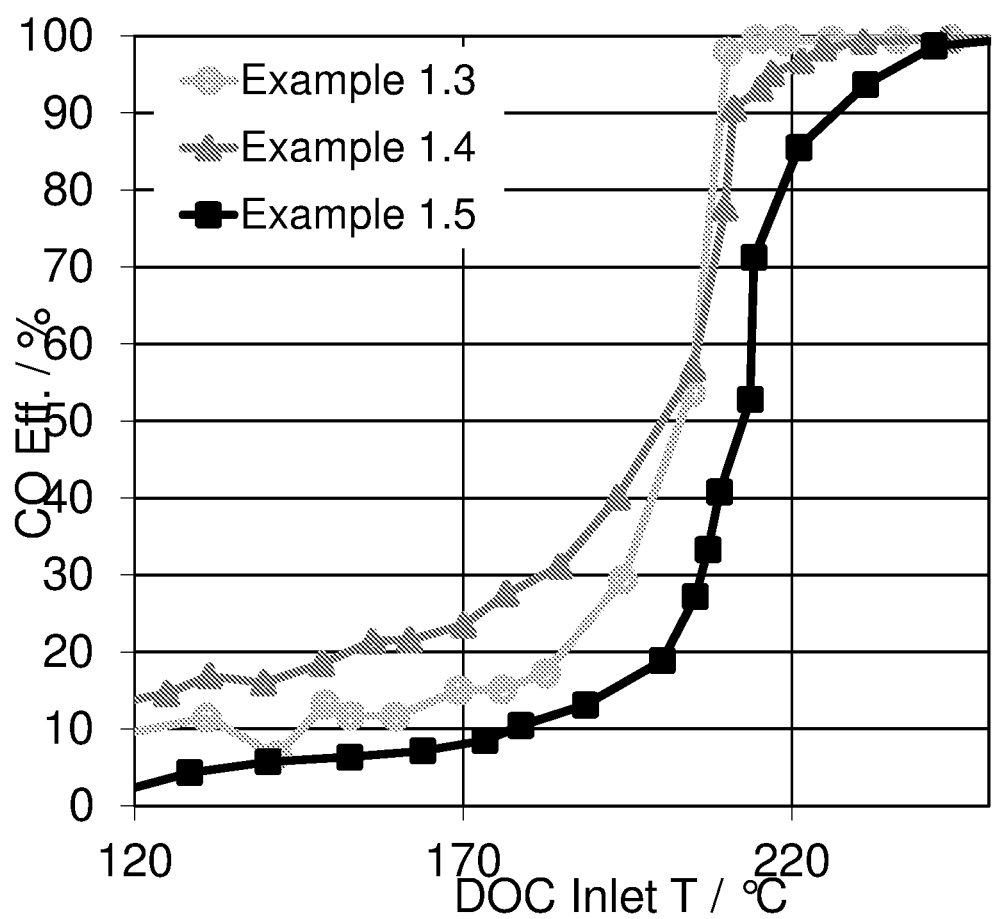
FIG. 3 shows CO performance of an LT-LNT with Pt/Pd impregnated on ceria compared to the corresponding LT-LNT with Pt/Pd impregnated on alumina support.
Figure 4:
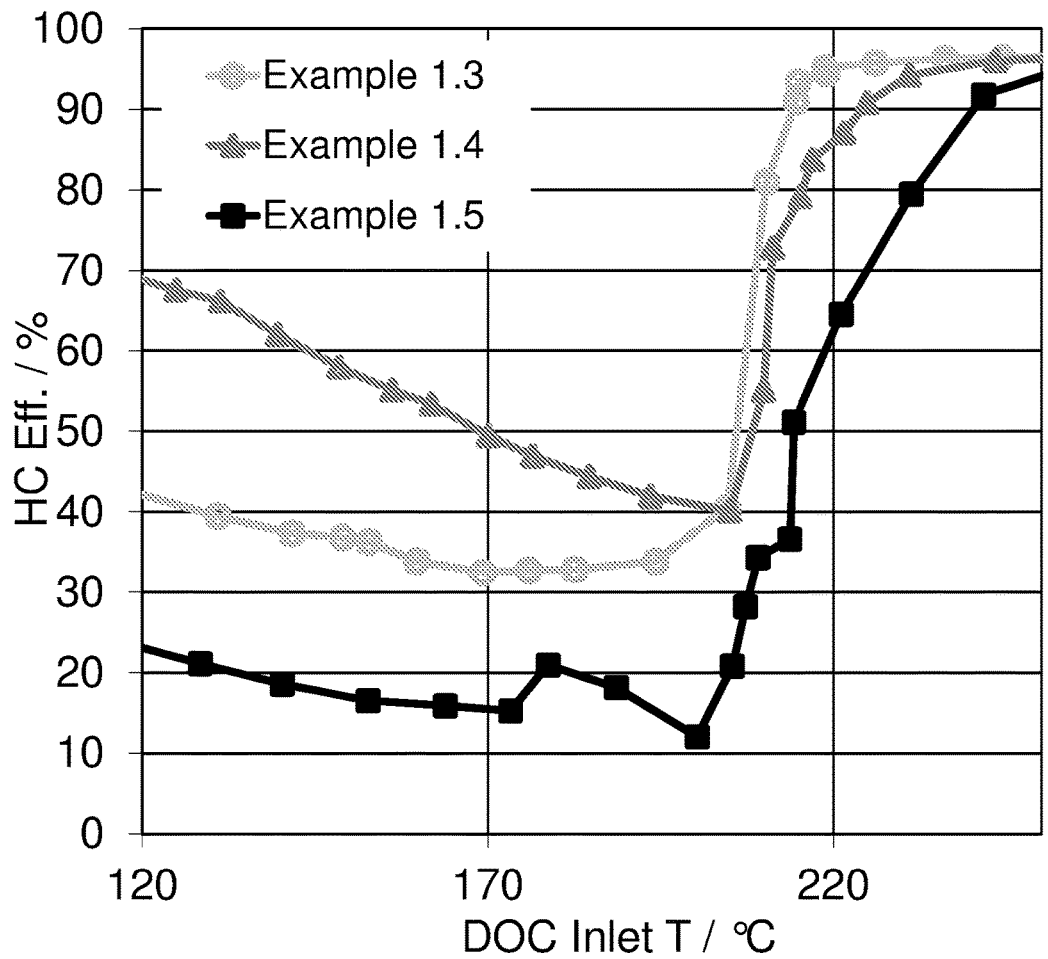
FIG. 4 shows HC performance of an LT-LNT with Pt/Pd impregnated on ceria compared to the corresponding LT-LNT with Pt/Pd impregnated on alumina support.

As shown in FIGS. 3 and 4, the LT-LNT with Pt/Pd impregnated on ceria (Sample 1.5) shows a significant lower CO and HC performance compared to the corresponding LT-LNT with Pt/Pd impregnated on alumina support (Sample 1.4). The incorporation of zeolite improves the HC performance of the LT-LNT.

1.3 Examples 1.6 and 1.11—Alumina: Ceria ratio, Ba and Support Variation, and LNT

TABLE 4

| Sample No. | Catalyst | PGM loading/ g/ft³ (Pt/Pd/Rh) | Ba loading on Ceria | PGM support | alumina:ceria ratio |
| --- | --- | --- | --- | --- | --- |
| 1.6 | LT-LNT B | 150 (130/15/5) | 0 | Alumina | 2.7 |
| 1.7 | LT-LNT E | 150 (130/15/5) | 0 | Alumina | 0.55 |
| 1.8 | LT-LNT F | 150 (130/15/5) | 1.7% | Alumina | 0.55 |
| 1.9 | LT-LNT G | 150 (130/15/5) | 5% | Alumina | 0.55 |
| 1.10 | LT-LNT H | 150 (130/15/5) | 0 | Alumina | 0.38 |
| 1.11 | LT-LNT I | 150 (130/15/5) | 0 | Alumina/Ceria = 50%/50% | 0.85 |
| 1.12 | LNT | 150 (130/15/5) | 0 | Ba/Alumina | n.a. |

Substrates 4.5 * 5.4" 300/600 metal substrate

Sample 1.6 LT-LNT (Inventive)

To prepare Sample 1.6, which represents a sample of an inventive LT-LNT B, 3 g/in³ of high porous γ-alumina was firstly impregnated with a Platinum solution with Platinum as an ammine stabilized hydroxo Pt IV complex to give a dry content of Pt 130 g/ft³ and secondly with an aqueous solution of Palladium nitrate giving a final dry Pd content of 15 g/ft³. The resulting powder with a solid content of 65-70% was dispersed in water.

For the Rh impregnation 100% Ceria material (0.3 g/in³) was dispersed into water to a solid content of 43%. A solution of Rh nitrate was added to the Ceria slurry giving a final dry Rh content of 5 g/ft³.

The resulting Rh/Ceria slurry, 100% Ceria material (0.8 g/in³), Magnesium acetate 4 hydrate (0.3 g/in³) and Zirconium acetate (0.05 g/in³) were added to the Pt/Pd/alumina slurry. The subsequent slurry was milled to a particle size d90 of 9 μm. The final slurry is subsequently coated onto a metallic flow through substrate. The coated substrate is dried at 110° C. air and calcined at 590° C. in air.

Sample 1.7 LT-LNT (Inventive)

To prepare Sample 1.7, which represents a sample of an inventive LT-LNT E, 1.8 g/in³ of high porous γ-alumina was firstly impregnated with a Platinum solution with Platinum as an ammine stabilized hydroxo Pt IV complex to give a dry content of Pt 130 g/ft³ and secondly with an aqueous solution of Palladium nitrate giving a final dry Pd content of 15 g/ft³. The resulting powder with a solid content of 65-70% was dispersed in water.

For the Rh impregnation, 100% Ceria material (0.4 g/in³) was dispersed into water to a solid content of 43%. A solution of Rh nitrate was added to the Ceria slurry giving a final dry Rh content of 5 g/ft³.

The resulting Rh/Ceria slurry, 100% Ceria material (2.85 g/in³), Magnesium acetate 4 hydrate (0.3 g/in³) and Zirconium acetate (0.05 g/in³) were added to the Pt/Pd/alumina slurry. The subsequent slurry was milled to a particle size d90 of 9 μm. The final slurry is subsequently coated onto a metallic flow through substrate. The coated substrate is dried at 110° C. air and calcined at 590° C. in air.

Sample 1.8 LT-LNT (Inventive)

To prepare Sample 1.8, which represents a sample of an inventive LT-LNT F, 1.8 g/in³ of high porous γ-alumina was firstly impregnated with a Platinum solution with Platinum as an ammine stabilized hydroxo Pt IV complex to give a dry content of Pt 130 g/ft³ and secondly with an aqueous solution of Palladium nitrate giving a final dry Pd content of 15 g/ft³. The resulting powder with a solid content of 65-70% was dispersed in water.

For the Rh impregnation, 100% Ceria material (0.4 g/in³) was dispersed into water to a solid content of 43%. A solution of Rh nitrate was added to the Ceria slurry giving a final dry Rh content of 5 g/ft³.

For the Ba impregnation on Ceria, 2.85 g/in³ of 100% Ceria material was impregnated with an aqueous solution of BaOAC (0.05 g/in³). The resulting powder was calcined at 590° C. for 2 h resulting in a Ba/Ceria material with 1.7% BaO content.

The Rh/Ceria slurry, Ba/Ceria material (2.9 g/in³), Magnesium acetate 4 hydrate (0.3 g/in³) and Zirconium acetate (0.05 g/in³) were added to the Pt/Pd/alumina slurry. The subsequent slurry was milled to a particle size d90 of 9 μm. The final slurry is subsequently coated onto a metallic flow through substrate. The coated substrate is dried at 110° C. air and calcined at 590° C. in air.

Sample 1.9 LT-LNT (Inventive)

To prepare Sample 1.9, which represents a sample of an inventive LT-LNT G, 1.8 g/in³ of high porous γ-alumina was firstly impregnated with a Platinum solution with Platinum as an ammine stabilized hydroxo Pt IV complex to give a dry content of Pt 130 g/ft³ and secondly with an aqueous solution of Palladium nitrate giving a final dry Pd content of 15 g/ft³. The resulting powder with a solid content of 65-70% was dispersed in water.

For the Rh impregnation, 100% Ceria material (0.4 g/in³) was dispersed into water to a solid content of 43%. A solution of Rh nitrate was added to the Ceria slurry giving a final dry Rh content of 5 g/ft³.

For the Ba impregnation on Ceria, 2.85 g/in³ of 100% Ceria material was impregnated with an aqueous solution of BaOAC (0.15 g/in³). The resulting powder was calcined at 590° C. for 2 h resulting in a Ba/Ceria material with 5% BaO content.

The Rh/Ceria slurry, Ba/Ceria material (3 g/in³), Magnesium acetate 4 hydrate (0.3 g/in³) and Zirconium acetate (0.05 g/in³) were added to the Pt/Pd/alumina slurry. The subsequent slurry was milled to a particle size d90 of 9 μm. The final slurry is subsequently coated onto a metallic flow through substrate. The coated substrate is dried at 110° C. air and calcined at 590° C. in air.

Sample 1.10 LT-LNT (Inventive)

To prepare Sample 1.10, which represents a sample of an inventive LT-LNT H, 1.3 g/in³ of high porous γ-alumina was firstly impregnated with a Platinum solution with Platinum as an ammine stabilized hydroxo Pt IV complex to give a dry content of Pt 130 g/ft³ and secondly with an aqueous solution of Palladium nitrate giving a final dry Pd content of 15 g/ft$^3$. The resulting powder with a solid content of 65-70% was dispersed in water.

For the Rh impregnation, 100% Ceria material (0.4 g/in$^3$) was dispersed into water to a solid content of 43%. A solution of Rh nitrate was added to the Ceria slurry giving a final dry Rh content of 5 g/ft$^3$.

The resulting Rh/Ceria slurry, 100% Ceria material (3.4 g/in$^3$), Magnesium acetate 4 hydrate (0.3 g/in$^3$) and Zirconium acetate (0.05 g/in$^3$) were added to the Pt/Pd/alumina slurry. The subsequent slurry was milled to a particle size d90 of 9 µm. The final slurry is subsequently coated onto a metallic flow through substrate. The coated substrate is dried at 110° C. air and calcined at 590° C. in air.

Sample 1.11 LT-LNT (Inventive)

To prepare Sample 1.11, which represents a sample of an inventive LT-LNT I, 4.7 g/in$^3$ of a Ce/Al (50%/50%) material was firstly impregnated with a Platinum solution with Platinum as an ammine stabilized hydroxo Pt IV complex to give a dry content of Pt 130 g/ft$^3$ and secondly with an aqueous solution of Palladium nitrate giving a final dry Pd content of 15 g/ft$^3$. The resulting powder with a solid content of 65-70% was dispersed in water.

For the Rh impregnation, 100% Ceria material (0.4 g/in$^3$) was dispersed into water to a solid content of 43%. A solution of Rh nitrate was added to the Ceria slurry giving a final dry Rh content of 5 g/ft$^3$.

The resulting Rh/Ceria slurry, Magnesium acetate 4 hydrate (0.3 g/in$^3$) and Zirconium acetate (0.05 g/in$^3$) were added to the Pt/Pd/alumina slurry. The subsequent slurry was milled to a particle size d90 of 9 µm. The final slurry is subsequently coated onto a metallic flow through substrate. The coated substrate is dried at 110° C. air and calcined at 590° C. in air.

Sample 1.12 State of the Art LNT (Comparative)

To prepare the first (bottom) layer of Sample 1.12, 2.45 g/in$^3$ of a Ba/Ce/Alumina (20/13/67) was firstly impregnated with a Platinum solution with Platinum as an ammine stabilized hydroxo Pt IV complex to give a dry content of Pt 90 g/ft$^3$ and secondly with an aqueous solution of Palladium nitrate giving a final dry Pd content of 15 g/ft$^3$. The resulting powder with a solid content of 65-70% was dispersed in water.

100% Ceria (2.45 g/in$^3$), Magnesium acetate 4 hydrate (0.3 g/in$^3$) and Zirconium acetate (0.05 g/in$^3$) were added to the Pt/Pd/Ba/Ce/Alumina slurry. The subsequent slurry was milled to a particle size d90 of 9 µm. The final slurry is subsequently coated onto a metallic flow through substrate. The coated substrate is dried at 110° C. air and calcined at 590° C. in air.

To prepare the second (top) layer of Sample 1.12, 0.7 g/in$^3$ of high porous γ-alumina material was firstly impregnated with a Platinum solution with Platinum as an ammine stabilized hydroxo Pt IV complex to give a dry content of Pt 40 g/ft$^3$. The resulting powder with a solid content of 55-60% was dispersed in water.

For the Rh impregnation, 100% Ceria material (0.5 g/in$^3$) was dispersed into water to a solid content of 43%. A solution of Rh nitrate was added to the Ceria slurry giving a final dry Rh content of 5 g/ft$^3$.

The resulting Rh/Ceria slurry was added to the Pt/Pd/alumina slurry. The subsequent slurry was milled to a particle size d90 of 8 µm. The final slurry is subsequently coated onto a metallic flow through substrate. The coated substrate is dried at 110° C. air and calcined at 590° C. in air.

Lean/Rich Cycle Test for DeNO$_x$ Performance Evaluation

Figure 5:
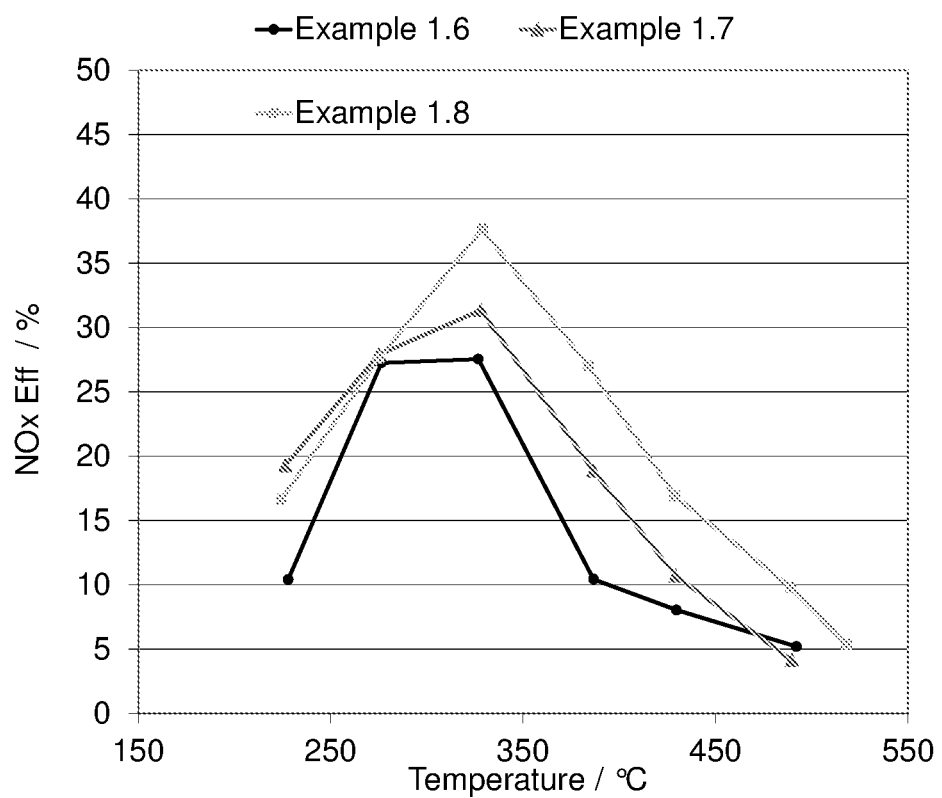
FIG. 5 shows an average NO$_x$ conversion of an LT-LNT of the present invention and a prior art LNT over the last 5 cycles of the 7 cycle lean rich test.
Figure 6:
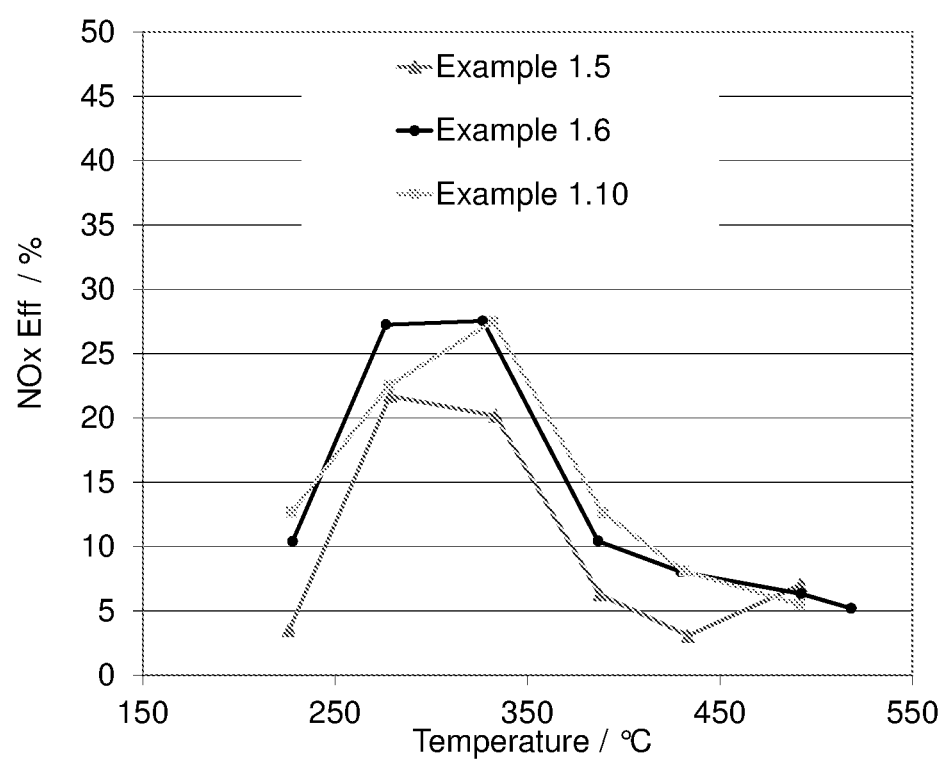
FIG. 6 shows an average NO$_x$ conversion of an LT-LNT of the present invention and a prior art LNT over the last 5 cycles of the 7 cycle lean rich test.

For DeNO$_x$ performance evaluation a lean/rich cycle test was used. The lean/rich cycle test is an engine test consisting of seven lean/rich cycles conducted at 7 different pre-catalyst temperatures from 200° C. to 500° C. For each temperature at the start of the test a rich operation of 30 seconds is conducted to assure all nitrates are desorbed from the LT-LNT. In the lean phase NO$_x$ from the engine out is stored on the LT-LNT catalyst. After the lean phase the engine goes into a rich mode for 10-15 second. During the rich mode most of the stored NO$_x$ on the catalyst is converted to nitrogen. As shown in FIGS. 5 and 6, the average NO$_x$ conversion of Samples 1.6-1.9 and Sample 1.11 over the last 5 cycles of the 7 cycle lean rich test and NO$_x$ emissions during the rich phase over the last 5 cycles is monitored and evaluated. The LT-LNTs are 16 h hydrothermal aged at 800° C. in oven.

As shown in FIG. 5, with increasing Ba loading in the LT-LNT, the NO$_x$ conversion at low temperatures is improved as well as the temperature window of the LT-LNT is widened to higher temperatures. As shown in FIG. 6, a lower ceria to alumina ratio in the LT-LNT improves the NO$_x$ conversion in the low temperature range.

World Light-Duty Harmonized Test Cycle (WLTC)—DeNO$_x$, CO and HC Performance Evaluation The samples were tested with a downstream SCR on filter (SCRoF) technology on an engine test cell with standard WLTC procedure. The test cell was equipped with a Euro 5 1.6 L engine and urea was constantly dosed upstream the SCRoF with a nominal stoichiometric ratio of ammonia and NO$_x$ ratio of 1.2 (NSR). The average temperature in the first 1000s of the WLTC cycles was 135° C. The SCRoF technology was currently available Cu-SCR technology. Prior to testing, the samples were aged for 16 hours at 800° C. under air flow with 10% water vapor or with 40 standard DeSOx events at 690° C. LT-LNT bed temperature. In case of the LNT and LT-LNT, a rich engine mode was applied during the WLTC at 5 different positions in the cycle at Lambda 0.95. The NO$_x$, CO and HC conversions over the samples were measured. Higher conversions characterize a better gas activity. Table 5 shows the conversion over the oven aged after treatment system with DOC or LT-LNT with a downstream SCRoF of the 3rd WLTC wherein emissions up-stream of the catalyst system are as follows: NO$_x$=0.335 g/km; CO=1.7 g/km; HC=0.225 g/km).

As shown in Table 5, the NO$_x$, CO and HC conversions over the LT-LNT systems (Samples 1.7 and 1.10) with a state of the art Cu-SCR technology is significantly higher compared to the DOC based system (Sample 1.1).

TABLE 5

| Sample | NO$_x$ Conversion/% | CO Conversion/% | HC Conversion/% |
|---|---|---|---|
| 1.1 DOC (Comp) | 46 | 60 | 73 |
| 1.7 LT-LNT (Inv) | 60 | 86 | 79 |
| 1.10 LT-LNT (Inv) | 65 | 93 | 82 |

Table 6 shows the conversion over the DeSOx aged system with LNT or LT-LNT with a downstream SCRoF of the 3rd test WLTC wherein the emissions up-stream of the catalyst system is as follows: NO$_x$=0.290 g/km; CO=1.7 g/km; HC=0.220 g/km. As shown in Table 6, the LT-LNT based system (Sample 1.7) shows a comparable NO$_x$ conversion and higher CO and HC conversion when compared to the LNT based system (Sample 1.12) of the prior art.

TABLE 6

| Sample | $NO_x$ Conversion/% | CO Conversion/% | HC Conversion/% |
|---|---|---|---|
| 1.12 LNT (Comp) | 67 | 72 | 69 |
| 1.7 LT-LNT (Inv) | 66 | 84 | 77 |

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed is:

1. A lean burn engine exhaust treatment article comprising:
a low temperature lean $NO_x$ trap (LT-LNT) composition comprising a washcoat layer on a carrier substrate,
wherein the washcoat layer comprises:
a platinum compound, a palladium compound, or a combination thereof impregnated on a first support material comprising ceria, alumina, or a combination thereof,
a rhodium compound impregnated on a second support comprising ceria, and
a low temperature $NO_x$ storage material comprising ceria optionally impregnated with from 1 to 10% of a barium compound.

2. The lean burn engine exhaust treatment article of claim 1, wherein the washcoat layer on a carrier substrate consists of one layer.

3. The lean burn engine exhaust treatment article of claim 1, wherein platinum, palladium, or a combination thereof is not directly impregnated on the low temperature $NO_x$ storage material.

4. The lean burn engine exhaust treatment article of claim 1, wherein the first support material comprises 100% alumina.

5. The lean burn engine exhaust treatment article of claim 1, wherein the first support material consists essentially of ceria and alumina.

6. The lean burn engine exhaust treatment article of claim 5, wherein the first support material comprises 20-50% by weight ceria and 50-80% by weight alumina.

7. The lean burn engine exhaust treatment article of claim 5, wherein the ceria and alumina are present in a ratio of 30:70 of ceria to alumina.

8. The lean burn engine exhaust treatment article of claim 5, wherein the ceria and alumina are present in a ratio of 50:50 of ceria to alumina.

9. The lean burn engine exhaust treatment article of claim 1, wherein the low temperature $NO_x$ storage material comprises 100% ceria.

10. The lean burn engine exhaust treatment article of claim 1, wherein the first support material further comprises at least one oxide dopant selected from the group consisting of oxides of La, Zr, Nb, Pr, Y, Nd, and Sm.

11. The lean burn engine exhaust treatment article of claim 1, wherein the washcoat layer comprises a combination of platinum and palladium.

12. The lean burn engine exhaust treatment article of claim 11, wherein alumina and ceria are present in the LT-LNT composition, and the ratio of alumina:ceria is from 4:1 to 1:4.

13. The lean burn engine exhaust treatment article of claim 12, wherein the ratio of alumina:ceria is from 1:1 to 1:4.

14. The lean burn engine exhaust treatment article of claim 13, wherein the ratio of alumina: ceria is from 1:1 to 1:3.

15. The lean burn engine exhaust treatment article of claim 12, wherein the LT-LNT composition is disposed as a washcoat on a substrate, and a content of alumina is from 1 to 4 $g/in^3$.

16. The lean burn engine exhaust treatment article of claim 11, wherein the LT-LNT composition comprises a content of Rh greater than 0 to 20 $g/ft^3$ on the second support.

17. The lean burn engine exhaust treatment article of claim 16, wherein the content of Rh is from 2 to 10 $g/ft^3$ on the second support.

18. The lean burn engine exhaust treatment article of claim 17, wherein the content of Rh is from 3 to 7 $g/ft^3$ on the second support.

19. The lean burn engine exhaust treatment article of claim 16, wherein a content of platinum is from 20 to 200 $g/ft^3$ and a content of palladium is from 1 to 50 $g/ft^3$.

20. The lean burn engine exhaust treatment article of claim 1, wherein the LT-LNT composition is free of barium and other alkaline earth metals.

21. A lean burn engine exhaust gas treatment system comprising the lean burn engine exhaust treatment article of claim 1 and a downstream selective catalytic reduction (SCR) catalyst.

22. The lean burn engine exhaust gas treatment system of claim 21, wherein the LT-LNT composition is disposed as a washcoat on a substrate and the SCR catalyst is disposed as a separate washcoat layer on a separate downstream substrate.

23. The lean burn engine exhaust gas treatment system of claim 22, wherein LT-LNT composition is on a honeycomb flow through substrate and the SCR catalyst is on a wall flow substrate.

24. The lean burn engine exhaust gas treatment system of claim 22, wherein LT-LNT composition is on a wall flow substrate and the SCR catalyst is on a honeycomb flow through substrate.

25. The lean burn engine exhaust treatment article of claim 1, wherein the LT-LNT composition further comprises from 1 to 10% by weight of an alkaline earth metal selected from the group consisting of Mg, Ca, Sr, and Ba.

26. The lean burn engine exhaust treatment article of claim 25, wherein the alkaline earth metal is Mg and Ba.

27. The lean burn engine exhaust treatment article of claim 25, wherein the alkaline earth metal is Ba.

28. A lean burn engine exhaust gas treatment system comprising the lean burn engine exhaust treatment article of claim 1 and a lambda sensor located downstream of the LT-LNT.

29. The lean burn exhaust system of claim 28, further comprising a second lambda sensor located upstream of the LT-LNT, wherein the lambda sensor and the second lambda sensor are in communication with an on board diagnostic system, which correlates deterioration of oxygen storage capacity of the LT-LNT with deteriorating HC conversion over the LT-LNT.

* * * * *

UNITED STATES PATENT AND TRADEMARK OFFICE
CERTIFICATE OF CORRECTION

PATENT NO. : 10,493,434 B2
APPLICATION NO. : 15/555131
DATED : December 3, 2019
INVENTOR(S) : Gerd Grubert et al.

It is certified that error appears in the above-identified patent and that said Letters Patent is hereby corrected as shown below:

In the Specification

Column 6, Line 42, "deNOx" should read -- $deNO_x$ --.

Column 9, Line 31, "alumina: ceria" should read -- alumina:ceria --,
    Line 34, "alumina: ceria" should read -- alumina:ceria --,
    Line 36, "alumina: ceria" should read -- alumina:ceria --, and
    Line 53, "flow-through" should read -- flow through --.

Column 16, Line 1, "g/in3" should read -- $g/in^3$ --, and
    Line 9, "g/in3" should read -- $g/in^3$ --.

Column 17, Line 21, "DeNOx" should read -- $DeNO_x$ --.

Column 19, Line 1, "Alumina: Ceria" should read -- Alumina:Ceria --.

Column 22, Line 34, "DeSOx" should read -- $DeSO_x$ --, and
    Line 60, "DeSOx" should read -- $DeSO_x$ --.

In the Claims

Column 23, Line 56, Claim 5, "bum" should read -- burn --,
    Line 59, Claim 6, "bum" should read -- burn --,
    Line 62, Claim 7, "bum" should read -- burn --, and
    Line 65, Claim 8, "bum" should read -- burn --.

Column 24, Line 1, Claim 9, "bum" should read -- burn --,
    Line 4, Claim 10, "bum" should read -- burn --, and
    Line 20, Claim 14, "alumina: ceria" should read -- alumina:ceria --.

Signed and Sealed this
Eleventh Day of August, 2020

Andrei Iancu
*Director of the United States Patent and Trademark Office*